(12) United States Patent
Lin (10) Patent No.: US 9,667,605 B2
(45) Date of Patent: May 30, 2017

(54) ELECTRONIC COMMUNICATION SYSTEM AND METHOD FOR COMMUNICATION OF THE SAME IN AN OPEN ENVIRONMENT

(71) Applicant: Gerard Lin, Los Gatos, CA (US)

(72) Inventor: Gerard Lin, Los Gatos, CA (US)

( * ) Notice: Subject to any disclaimer, the term of this patent is extended or adjusted under 35 U.S.C. 154(b) by 237 days.

(21) Appl. No.: 14/742,988

(22) Filed: Jun. 18, 2015

(65) Prior Publication Data

US 2016/0021076 A1 Jan. 21, 2016

Related U.S. Application Data

(60) Provisional application No. 62/026,975, filed on Jul. 21, 2014.

(51) Int. Cl.
*H04L 29/06* (2006.01)

(52) U.S. Cl.
CPC .......... *H04L 63/0435* (2013.01); *H04L 63/06* (2013.01); *H04L 63/061* (2013.01); *H04L 63/062* (2013.01); *H04L 63/0876* (2013.01); *H04L 63/0884* (2013.01); *H04L 63/10* (2013.01)

(58) Field of Classification Search
CPC .................................................. H04L 63/0435
See application file for complete search history.

(56) References Cited

U.S. PATENT DOCUMENTS 7,971,234 B1 * 6/2011 Sussland .............. G06F 21/606
                                                        713/168
2011/0264905 A1 * 10/2011 Ovsiannikov ..... H04L 29/08792
                                                         713/151

FOREIGN PATENT DOCUMENTS

CH     WO2007104174    *   9/2007  ............. H04L 29/06

* cited by examiner

*Primary Examiner* — Harunur Rashid
*Assistant Examiner* — Thanh Le
(74) *Attorney, Agent, or Firm* — patenttm.us (57) ABSTRACT

An electronic communication system and a method allowing communication to be performed in an open environment are provided for a server to authenticate a user that has no account with the server and to allow the user to perform operations with the server. Users having accounts with different servers in different electronic communication systems may authenticate each other and then communicate with common communication protocols across different application systems. An inviter may invite an invitee to access the inviter's resources saved on a server that the invitee has no account with. Other than the inviter and invitee, no one including the server can access the inviter's resources.

6 Claims, 5 Drawing Sheets

ELECTRONIC COMMUNICATION SYSTEM AND METHOD FOR COMMUNICATION OF THE SAME IN AN OPEN ENVIRONMENT

CROSS-REFERENCE TO RELATED APPLICATIONS

This application claims the benefit of U.S. provisional application No. 62/026,975, filed on Jul. 21, 2014, the disclosures of which are incorporated herein in their entirety by reference.

BACKGROUND OF THE INVENTION

1. Field of the Invention

The present invention relates to an electronic communication system and an method of electronic communication, and more particularly to an electronic communication system and a method allowing communication of the electronic communication system to be performed in an open environment such that a server of the electronic communication system can authenticate a user that has no account with the server and may allow the user to perform operations with the server, users having accounts with different servers of the electronic communication system in different communication networks may authenticate each other and then communicate across different application systems, and an inviter may invite an invitee to access the inviter's resources saved on a server of the electronic communication system that the invitee has no account with but the invitee's identity can be authenticated by the server of the electronic communication system.

2. Description of the Related Art

Conventionally, only users having accounts with a server may utilize services provided by the server. Users having no account with the server cannot utilize services provided by the server.

For example, a user having an account with a school or public library may utilize the resources of the school library or public library. But if the user has no account with a second school or public library, the user cannot utilize the resources of the second school or public library because the user's identity cannot be authenticated by the second school or public library.

Likewise, communication between two users needs to have accounts in the same conventional electronic communication system so that the identities of users can be verified by servers in the conventional electronic communication system before the users make connection for communication. Therefore, electronic message communication can only be performed in a closed environment constituted by such conventional electronic communication system. Taking instant messaging systems as an example, only users having accounts in the same instant messaging system can communicate with each other, and users having accounts in different instant messaging systems are unable to communicate. One fundamental issue that prevents users of different electronic communication systems from communicating with each other is authentication of the users' identities across different electronic communication systems.

Speaking of users, an inviter can invite an invitee to access some resources available to the inviter on a server. If the invitee has no account with the server, currently one typical way is to provide a hyperlink with an access code to the invitee via e-mail. Clicking the hyperlink, the invitee may make connection to the server and access the inviter's resources. However, such a hyperlink could be peeped or intercepted by others. Another way for the invitee to access the inviter's resources is to set up an account with the same server if not yet. Therefore, both the inviter and the invitee need to have accounts with the server and communicate in a close environment.

SUMMARY OF THE INVENTION

To overcome the disadvantages of the conventional method in accordance with the purpose of the invention as embodied and broadly described herein, the present invention provides electronic communication systems and methods allowing a server to authenticate a user's identity even if the user has no account with the server. Therefore, the server may provide services to the user based on policies of the electronic communication system.

For example, a student, who has an account with a school library, may be authenticated by other school libraries that the student has no account with. Therefore, the student may utilize resources at many school libraries based on the policies of the school libraries.

The present invention also allows users having accounts in different electronic communication systems such as different instant messaging systems to authenticate and communicate with each other for textual communication, online chatting, exchanging photos, exchanging files, video communication, etc.

The present invention allows an inviter to invite an invitee to access the inviter's resources saved on a server even if the invitee has no account with the server. The invitee's identity can be authenticated by the server. The inviter's resources can be accessed by the inviter and invitee only. The server cannot access the inviter's resources.

A private-public key pair is used for data privacy between a sender and a recipient so that data won't be revealed to others.

Typical steps of using the private-public key pair for sending data with privacy are as follows:

1. The sender encrypts data with the recipient's public key.
2. The sender sends the encrypted data to the recipient.
3. The recipient decrypts the encrypted data with the recipient's private key to obtain data. Since only the recipient has the recipient's private key, data privacy is sustained.

Typical steps of using private-public key pair for authenticating an identity are as follows:

1. The sender encrypts data with sender's private key.
2. The sender sends the encrypted data to the recipient.
3. The recipient decrypts the encrypted data with the sender's public key. If decryption succeeds, then the sender's identity is authenticated since only the sender has the sender's private key.

For a few reasons in the industry, the recipient's private-public key pair is not used to encrypt and decrypt data directly. Instead, a symmetric key of symmetric cryptography is used to encrypt and decrypt data, and the recipient's private-public key pair is used to encrypt and decrypt the symmetric key for the same purposes of data privacy.

Steps of using the symmetric key and the recipient's private-public key pair for data privacy are as follows:

1. The sender encrypts data with a symmetric key.
2. The sender encrypts the symmetric key with the recipient's public key.
3. The sender sends the encrypted symmetric key and the encrypted data to the recipient.
4. The recipient decrypts the encrypted symmetric key with the recipient's private key to obtain the symmetric key.

Only the recipient can get the symmetric key since only the recipient has the recipient's private key.

5. The recipient decrypts the encrypted data with the symmetric key to obtain data.

Instead of using the sender's private-public key pair to encrypt and decrypt data directly for authenticating the identity of the sender, a sender's electronic signature may be generated for authenticating the sender's identity and verifying the content of data. Steps of generating an electronic signature for the sender to endorse the content of data are as follows:

1. The sender generates a message digest (message digest #1) of data using a hash-function algorithm.

2. The sender encrypts the message digest #1 with the sender's private key to generate a sender's electronic signature on the data.

3. The sender sends data and the sender's electronic signature to the recipient.

4. The recipient verifies the sender's electronic signature by decrypting the encrypted message digest #1 with the sender's public key to obtain the message digest #1 and verifying the received data against the message digest #1. If decryption of the encrypted message digest #1 succeeds, then the sender's identity is authenticated. Verification of data is done by generating a message digest (message digest #2) of the received data using the same hash-function algorithm and checking the message digest #2 against the message digest #1. If and only if the message digest #2 is identical to the message digest #1, then the received data is verified.

One way of using private-public key pair for sustaining data privacy and authenticating the sender's identity is as follows:

1. The sender generates a sender's electronic signature on data (data #1) with the sender's private key.

2. The sender generates a data (data #2) containing data #1 and the sender's electronic signature.

3. The sender encrypts the data #2 with a symmetric key to come out an encrypted data #3.

4. The sender encrypts the symmetric key with the recipient's public key to come out an encrypted data #4.

5. The sender generates a data (data #5) containing the encrypted data #4 and the encrypted data #3.

6. The sender sends the data #5 to the recipient.

7. The recipient decrypts the encrypted data #4 with the recipient's private key to obtain the symmetric key. Since only the recipient has the recipient's private key, data privacy is sustained.

8. The recipient decrypts the encrypted data #3 with the symmetric key to obtain data #1 and the sender's electronic signature.

9. The recipient verifies the sender's electronic signature with the sender's public key. If verification succeeds, then the sender's identity is authenticated since only the sender has sender's private key and the content of the data is verified.

Another way of using private-public key pair for the same purposes of sustaining data privacy and authenticating the sender's identity is as follows:

1. The sender encrypts data #1 with a symmetric key to generate an encrypted data #2.

2. The sender encrypts the symmetric key with the recipient's public key to generate an encrypted data #3.

3. The sender generates a data (data #4) containing the encrypted data #3 and the encrypted data #2.

4. The sender generates a sender's electronic signature on the data #4 with the sender's private key.

5. The sender generates a data (data #5) containing the data #4 and the sender's electronic signature.

6. The sender sends the data #5 to the recipient.

7. The recipient verifies the sender's electronic signature with the sender's public key. If verification succeeds, then the sender's identity is authenticated since only the sender has sender's private key and the content of the data #4 is verified. However, parties other than the recipient might obtain data #4 as well regardless whether or not having the sender's public key to authenticate the sender's identity or verify the content of data #4.

8. The recipient decrypts the encrypted data #3 with the recipient's private key to obtain the symmetric key. Data privacy is still sustained since only the recipient has the recipient's private key.

9. The recipient decrypts the encrypted data #2 with the symmetric key to obtain the data #1.

In the description of this document, in order to simplify statements for focusing on the features directly relevant to the present invention, the recipient's private-public key pair is used to encrypt and decrypt data directly for data privacy, the steps may be replaced by using a symmetric key in the actual implementation. And the sender's private-public key pair is used to encrypt and decrypt data directly for authenticating the sender's identity, the steps may be replaced by using a sender's electronic signature in the actual implementation.

Instead of taking the typical steps of using the sender's private-public key pair for authenticating the sender's identity as described in the previous paragraphs, an alternative approach of using the private-public key pairs of the sender and the recipient for sending and returning a verification token to authenticate the identity of the recipient by the sender is as follows:

1. The sender generates a verification token #1 that is a text, a graphic, a sound, a voice, a video, or a combination thereof.

2. The sender encrypts the verification token #1 with the recipient's public key.

3. The sender sends the encrypted verification token #1 to the recipient.

4. The recipient decrypts the encrypted verification token #1 with the recipient's private key to obtain a verification token #2 that is supposed to be identical to the verification token #1.

5. The recipient encrypts the verification token #2 with the sender's public key.

6. The recipient sends the encrypted verification token #2 to the sender.

7. The sender decrypts the encrypted verification token #2 with the sender's private key to obtain the verification token #2.

8. The sender checks the verification token #2 against the verification token #1; if the verification token #2 is identical to the verification token #1, then the recipient's identity is verified.

Other objectives, advantages and novel features of the invention will become more apparent from the following detailed description when taken in conjunction with the accompanying drawings.

DETAILED DESCRIPTION OF THE INVENTION

All the drawings illustrate common methods of obtaining a server computer's public key by others, submitting a client device's public key to an administrating server computer that administrates the client device's account, providing the client device's public key by the administrating server computer to others so that authentication may be performed between each other for communication in an open environment. Each drawing illustrates the flow of how data is transferred in details.

Figure 1:
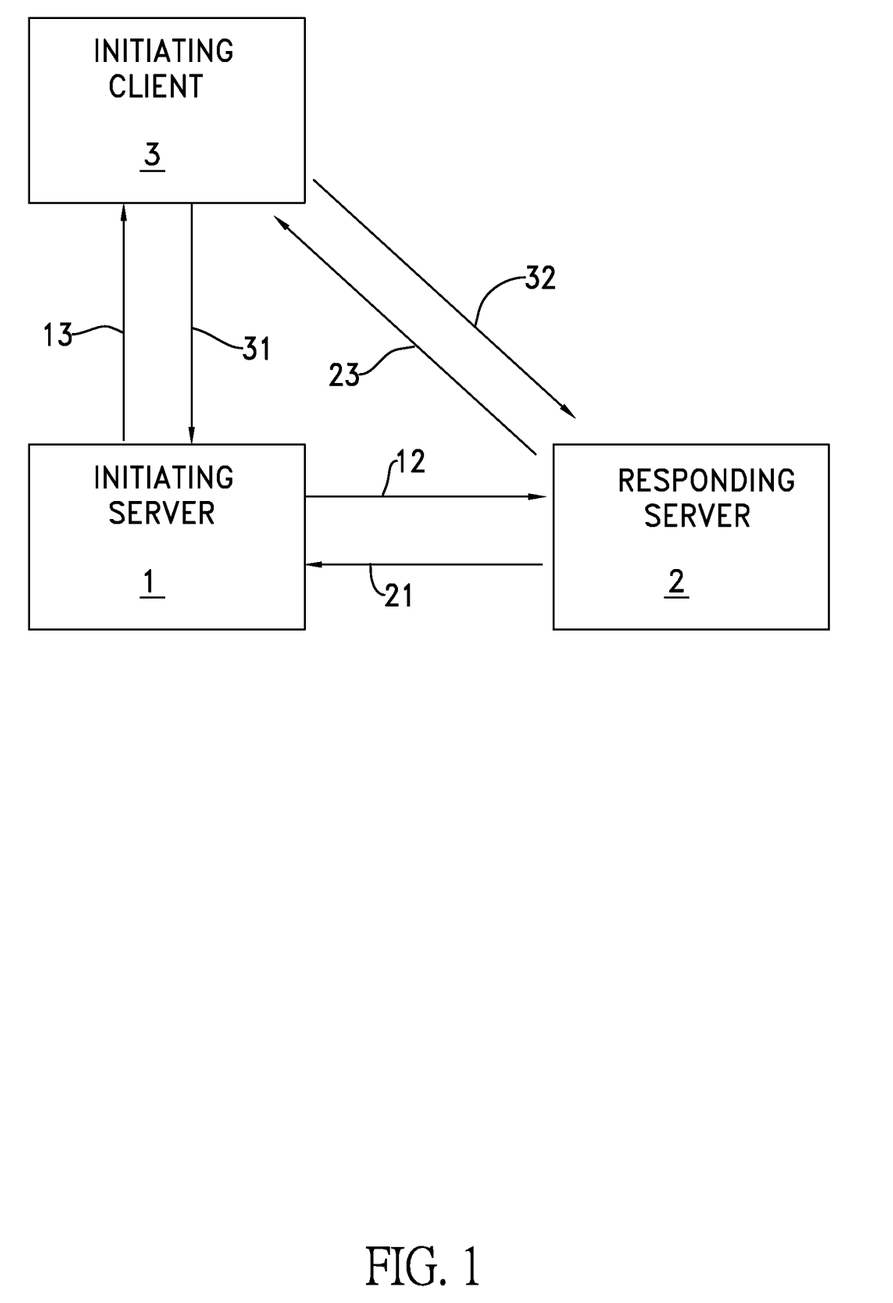
FIG. 1 is a functional block diagram of a first embodiment of an electronic communication system illustrating a first embodiment of a method for communication of the electronic system in an open environment in accordance with the present invention.

With reference to FIG. 1, a first embodiment of an electronic communication system in accordance with the present invention is shown to illustrate communication for a server to authenticate the identity of a user (initiator) that has no account with the server, and has an initiating server 1, a responding server 2 and an initiating client 3 connected to communication networks.

The initiating server 1 is a host computer administrating an initiator's account with an initiator's account ID (identification). The responding server 2 is a host computer that the initiator has no account with. The initiating client 3 is a local communication device, such as a computer or a mobile phone, used by the initiator with an intent to perform operations with the responding server 2.

Each of the initiating server 1 and the responding server 2 is assigned with a unique name, such as a domain name that is registered with authoritative organizations and can be used for establishing a connection thereto.

The initiating server 1, the responding server 2, and the initiating client 3 all are capable of generating private-public key pairs, encrypting and decrypting electronic messages using public key cryptography, and creating message digests of electronic messages using hash-function algorithms.

Each of the initiating client 3, the initiating server 1, and the responding server 2 generates a private-public key pair and keeps a private key of the private-public key pair. The initiating server 1 may send e-mails to the initiating client 3.

A first embodiment of a method for communication of the electronic communication system in an open environment is performed by the electronic communication system and includes a public key acquisition process and a client identity authentication process.

The public key acquisition process serves for the initiating client 3 and the initiating server 1 (the responding server 2) to have the public key of the responding server 2 (the initiating server 1) and has the following steps.

Step 101: The responding server 2 (initiating server 1) provides the public key of the responding server 2 (initiating server 1) at a web site for download. The web site has a unique name, such as a domain name that is registered with authoritative organizations and can be used for establishing a connection thereto.

Step 102: Any one of the initiating client 3 and the initiating server 1 (responding server 2) may download the public key of the responding server 2 (initiating server 1) from the web site using the unique name of the responding server 2 (initiating server 1).

Instead of downloading the public key of the responding server 2 (initiating server 1) from a web site, the responding server 2 (initiating server 1) may provide the public key of the responding server 2 (initiating server 1) to any one that makes connection to the responding server 2 (initiating server 1) using the unique name of the responding server 2 (initiating server 1).

After the initiating client 3 downloads the public key of the initiating server 1 as described in the previous paragraphs, the public key acquisition process further has the following steps for the initiating server 1 to have the public key of the initiating client 3.

Step 201: The initiating server 1 generates an activation token (activation token #1) containing a text, a graphic, a sound, a voice, a video, or a combination thereof.

Step 202: The initiating server 1 generates an electronic signature on the activation token #1 with the private key of the initiating server 1.

Step 203: The initiating server 1 generates data (data #1) containing the activation token #1, the electronic signature and a portion of the initiator's account ID that may be recognized by the initiator without revealing the full initiator's account ID.

Step 204: The initiating server 1 provides data #1 to the initiator such as via e-mailing. The initiator moves the activation token #1 and the electronic signature to the initiating client 3 if the received data #1 is not on the initiating client 3.

Step 205: The initiating client 3 verifies the electronic signature with the public key of the initiating server 1. If the verification fails, then the process terminates; otherwise, the process proceeds to the next step.

Step 206: The initiating client 3 makes connection to the initiating server 1.

Step 207: The initiating client 3 generates data (data #2) containing the initiator's account ID, activation token #2, and the public key of the initiating client 3.

Step 208: The initiating client 3 encrypts data #2 with the public key of the initiating server 1.

Step 209. The initiating client 3 sends the encrypted data #2 to the initiating server 1. Such flow of the data #2 is represented by an information flow 31 in FIG. 1.

Step 210: The initiating server 1 decrypts the encrypted data #2 with the private key of the initiating server 1 to obtain the initiator's account ID, activation token #2, and the public key of the initiating client 3.

Step 211: The initiating server 1 checks the activation token #2 against the activation token #1. If the activation token #2 is identical to the activation token #1, the initiating server 1 keeps the public key of the initiating client 3 to be associated with the initiator's account ID.

Based on the above description, some of the major advantages of the public key acquisition process can be summarized as follows.

1. By verifying the electronic signature of the initiating server 1, the initiating client 3 may authenticate the identity of the initiating server 1 that provides the activation token #1 and ensure the validity of the activation token #1.

2. The data #1 contains only a portion of the initiator's account ID that may be recognized by initiator without revealing the full initiator's account ID for security to a degree.

3. Even if the activation token #1 is intercepted by others, the interceptor might not be able to get the public key of the initiating server 1 in a timely fashion that is required for the encryption of the data #2.

4. The data #2 containing the full initiator's account ID and the activation token #2 is encrypted with the public key of the initiating server 1. Only the initiating server 1 has the private key of the initiating server 1 to obtain the initiator's account ID for verifying the activation token #2 against the activation token #1.

Instead of using the activation token to authenticate the identity of the initiating client 3 when the initiating client 3 provides the public key of the initiating client 3 to the initiating server 1, an account password of the initiating client 3 may be used as in the following steps.

Step 301: The initiating client 3 makes connection to the initiating server 1.

Step 302: The initiating client 3 generates data (data #1) containing the initiator's account ID, the account password, and the public key of the initiating client 3.

Step 303: The initiating client 3 encrypts data #1 with the public key of the initiating server 1.

Step 304: The initiating client 3 sends the encrypted data #1 to the initiating server 1. Such flow of the data #1 is represented by an information flow 31 in FIG. 1.

Step 305: The initiating server 1 decrypts the encrypted data #1 with the private key of the initiating server 1 to obtain the initiator's account ID, the account password, and the public key of the initiating client 3.

Step 306: The initiating server 1 verifies the account password, and then keeps the public key of the initiating client 3 to be associated with the initiator's account ID.

After the initiating server 1, the responding server 2 and the initiating client 3 have the public keys of the initiating server 1, the responding server 2 and the initiating client 3 as described in the previous paragraphs with the exception that the responding server 2 doesn't have the public key of the initiating client 3. The client identity authentication process serves for the responding server 2 to authenticate the identity of the initiating client 3 when the initiating client 3 intends to perform operations with the responding server 2, has the following steps.

Step 401: The initiating client 3 makes connection to the responding server 2.

Step 402: The initiating client 3 generates data (data #1) containing the initiator's account ID and the unique name of the initiating server 1.

Step 403: The initiating client 3 sends the data #1 to the responding server 2. Such flow of the data #1 is represented by an information flow 32 in FIG. 1.

Step 404: The responding server 2 establishes a connection to the initiating server 1 based on the unique name of the initiating server 1.

Step 405: The responding server 2 generates data (data #2) containing the initiator's account ID.

Step 406: The responding server 2 sends data #2 to the initiating server 1. Such flow of the data #2 is represented by an information flow 21 in FIG. 1.

Step 407: Based on the initiator's account ID, the initiating server 1 generates data (data #3) containing the public key of the initiating client 3.

Step 408: The initiating server 1 sends data #3 to the responding server 2 using the private-public key pair of the initiating server 1 for authenticating the identity of the initiating server 1. Such flow of the data #3 is represented by an information flow 12 in FIG. 1.

Step 409: The responding server 2 generates a verification token containing a text, a graphic, a sound, a voice, a video, or a combination thereof.

Step 410: The responding server 2 sends the verification token to the initiating client 3 using the private-public key pairs of the responding server 2 and the initiating client 3 for verifying the identity of the initiating client 3; if the verification succeeds, then the responding server 2 may allow the initiating client 3 to perform further operations with the responding server 2.

If it is necessary to keep the initiator's account ID private so that the responding server 2 or others cannot know, a few steps in the client identity authentication process may be revised as follows:

Step 402': The initiating client 3 encrypts the initiator's account ID with the public key of the initiating server 1. Data #1 contains the encrypted initiator's account ID and the unique name of the initiating server 1.

Step 405': The responding server 2 generates data (data #2) containing the encrypted initiator's account ID instead of the initiator's account ID.

Step 406': After obtaining data #2, which is the encrypted initiator's account ID, the initiating server 1 further decrypts the encrypted initiator's account ID with the private key of the initiating server 1 to obtain the initiator's account ID.

Based on the above description, some of the major advantages of the client identity authentication process can be summarized as follows.

1. The responding server 2 obtains the public key of the initiating client 3 from the initiating server 1. The initiating server 1 administrates the account of the initiator using the initiating client 3 and is the most authoritative entity to provide the public keys for account holders thereof.

2. There is no need for any third party to involve in activities, such as providing the public key of the initiating client 3 or certifying the public key of the initiating client 3.

3. The public key of the initiating client 3 is provided by encryption with the private key of the initiating server 1 to ensure validity by the initiating server 1.

4. In the event that the initiating client 3 sends the initiator's account ID encrypted with public key of the initiating server 1 to the responding server 2, the responding server 2 cannot know the initiator's account ID. Also, the initiator's account ID won't be eavesdropped by others during data transfer.

5. Using the verification token to verify the identity of the initiating client 3 by the responding server 2 allows the responding server 2 to initiate the verification process after obtaining the public key of the initiating client 3 from the initiating server 1. Otherwise, extra steps will be needed for the responding server 2 to request the initiating client 3 to initiate the verification process by sending redundant data from the initiating client 3 to the responding server 2 using the private-public key pair of the initiating client 3.

6. As long as a client has an account with a server (server #1), the identity of the client may be authenticated by another server (server #2) that the client has no account with; and server #2 may allow the client to perform operations with server #2. Therefore, communication may be performed in an open environment rather than in a closed environment that only client having an account with a server can perform operations with the server.

Figure 2:
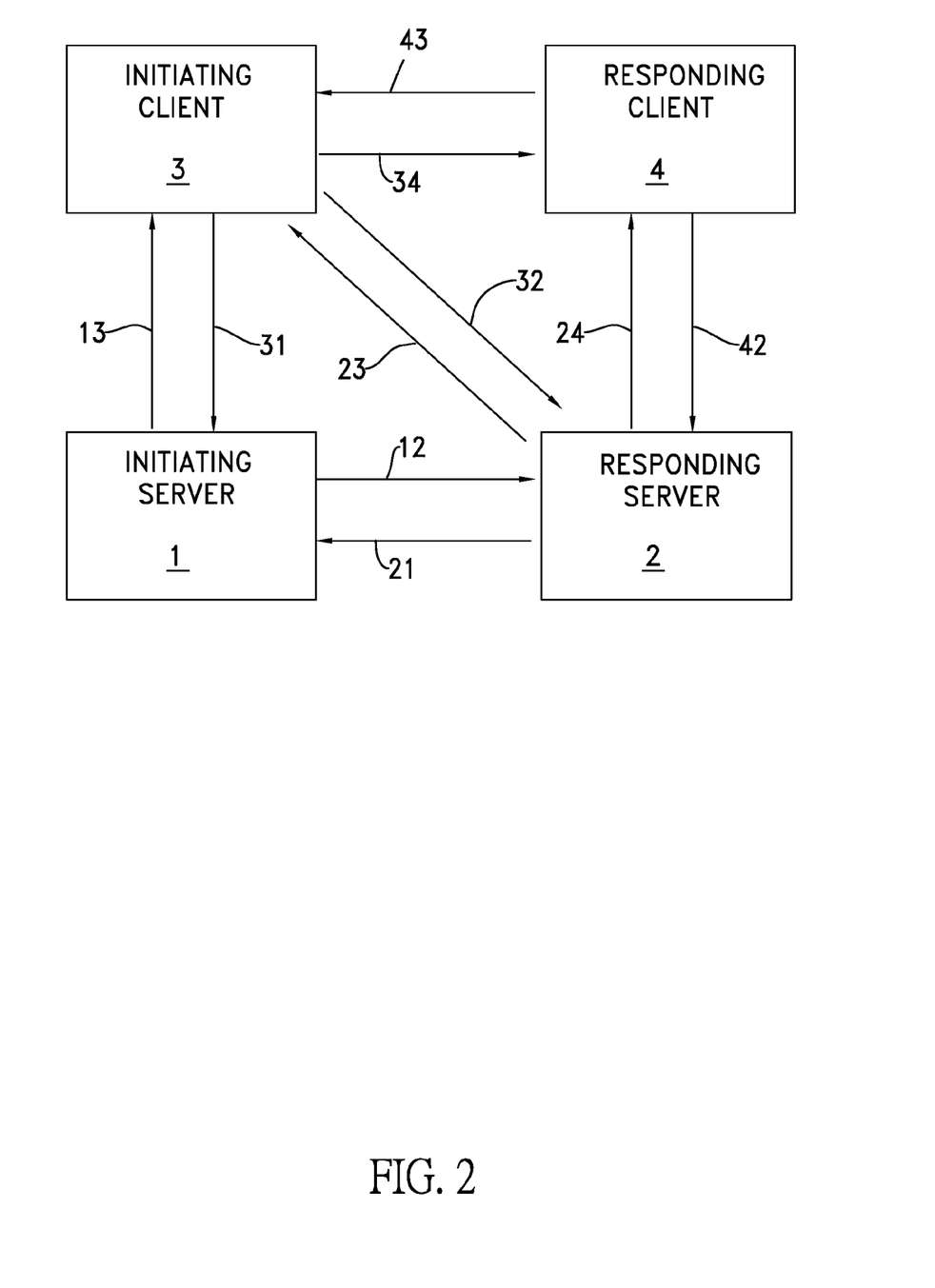
FIG. 2 is a functional block diagram of a second embodiment of an electronic communication system illustrating a second embodiment of a method for communication of the electronic system in an open environment in accordance with the present invention.

With reference to FIG. 2, a second embodiment of an electronic communication system in accordance with the present invention is shown to illustrate communication for two users having accounts with different servers in different communication networks to communicate with each other, and differs from the first embodiment of the electronic communication system in having an additional responding client 4. The initiating server 1, the responding server 2, the initiating client 3 and the responding client 4 are connected to the communication networks.

The responding client 4 is a local communication device, such as a computer or a mobile phone, used by a user (responder) that the user (initiator) of the initiating client 3 intends to communicate with. The initiator knows a responder's account ID of a responder's account that is administrated by the responding server 2. The initiator's account ID optionally contains an initiator's name for easier recognition of the initiator by the responder. The responding client 4 monitors electronic messages from the responding server 2 at regular time, and is capable of generating a private-public key pair and keeping a private key of the responding client 4, encrypting and decrypting the electronic messages using the public key cryptography, and creating message digests of the electronic messages using hash-function algorithms.

A second embodiment of a method for communication of the electronic communication system in an open environment is performed by the electronic communication system and includes a public key acquisition process and a client identity authentication process.

The public key acquisition process includes steps for the responding client 4 to have the public key of the responding server 2 that are similar to the steps of obtaining the public key of the responding server 2 by anyone from a web site of the responding server 2 in the first embodiment of the method, steps for the responding server 2 to have the public key of the responding client 4 that are similar to the steps of obtaining the public key of the initiating client 3 by the initiating server 1 in the first embodiment of the method, and steps of obtaining the public key of the initiating client 3 by the responding server 2 are described in the first embodiment of the method.

The client identity authentication process for the initiator and the responder to authenticate and communicate with each other differs from that of the first embodiment of the method in further having the following steps.

Step 501: The initiating client 3 makes connection to the responding server 2 if not yet.

Step 502: The initiating client 3 generates data (data #1) containing the responder's account ID and the initiator's account ID.

Step 503: The initiating client 3 sends data #1 to the responding server 2 using the private-public key pair of the initiating client 3 and the private-public key pair of the responding server 2 for sustaining data privacy and authenticating the identity of the initiating client 3. Such flow of the data #1 is represented by an information flow 31 in FIG. 2.

Step 504: The responding server 2 generates data (data #2) containing the public key of the responding client 4 based on the responder's account ID.

Step 505: The responding server 2 sends data #2 to the initiating client 3 using the private-public key pair of the responding server 2 and the private-public key pair of the initiating client 3 for sustaining data privacy and authenticating the identity of the responding server 2. Such flow of the data #2 is represented by an information flow 23 in FIG. 2.

Step 506: The responding server 2 detects an IP Address of the initiating client 3.

Step 507: The responding server 2 generates data (data #3) containing the initiator's account ID, the IP Address of the initiating client 3, and the public key of the initiating client 3.

Step 508: The responding server 2 sends data #3 to the responding client 4 using the private-public key pair of the responding server 2 and the private-public key pair of the responding client 4 for sustaining data privacy and authenticating the identity of the responding server 2. Such flow of the data #3 is represented by an information flow 24 in FIG. 2.

Step 509: Based on the initiator's account ID, the responder determines whether or not to accept the initiator's invitation. If a decision is made not to accept, process terminates; otherwise, the process proceeds to the following steps.

Step 510: The responding client 4 makes connection to the initiating client 3 based on the IP Address of the initiating client 3.

Step 511: The responding client 4 generates a verification token (verification token #1) containing a text, a graphic, a sound, a voice, a video, or a combination thereof.

Step 512: The responding client 4 generates data (data #4) containing the responder's account ID and the verification token #1.

Step 513: The responding client 4 sends data #4 to the initiating client 3 using the private-public key pair of the responding client 4 and the private-public key pair of the initiating client 3 for sustaining data privacy and authenticating the identity of the responding client 4. Such flow of the data #4 is represented by an information flow 43 in FIG. 2.

Step 514: The initiating client 3 checks if the responder's account ID is what the initiating client 3 intends to communicate with. If not, the process terminates; otherwise, the process proceeds to a next step.

Step 515: The initiating client 3 generates data (data #5) containing the verification token #1 as a verification token #2.

Step 516: The initiating client 3 sends data #5 to the responding client 4 using the private-public key pair of the initiating client 3 and the private-public key pair of the responding client 4 for sustaining data privacy and authenticating the identity of the initiating client 3. Such flow of the data #5 is represented by an information flow 34 in FIG. 2.

Step 517: The responding client 4 checks the verification token #2 against the verification token #1. If the verification token #2 is identical to the verification token #1, the responding client 4 and the initiating client 3 may begin communication based on common communication protocols.

Some examples of common communication protocols may be as follows:
SEND TEXT UNICODE text-data
SEND GRAPHIC JPG image-data
SEND VOICE CODEC G.711_64 voice-data
SEND VIDEO CODEC H.263/MPEG-4_Part2 video-data Based on the above description, there are many advantages available for two users to communicate with each other. Some of the major advantages are:

1. Even though the users have accounts in different electronic communication systems, they may communicate with each other via connection of the invitee's server by the inviter.

2. At the very beginning, when the initiating client 3 sends data #1 with the initiator's intent of communicating with the responder, the responding server 2 authenticates the identity of the initiating client 3 before proceeding to the following steps.

3. Prior to the intended communication, each user authenticates the identity of the other party using the public key of the other party that is provided by the other party's server, the most authoritative entity to provide the public keys for account holders thereof.

4. The sent data is encrypted with the private-public key pairs for data privacy and authentication of the sender.

Figure 3:
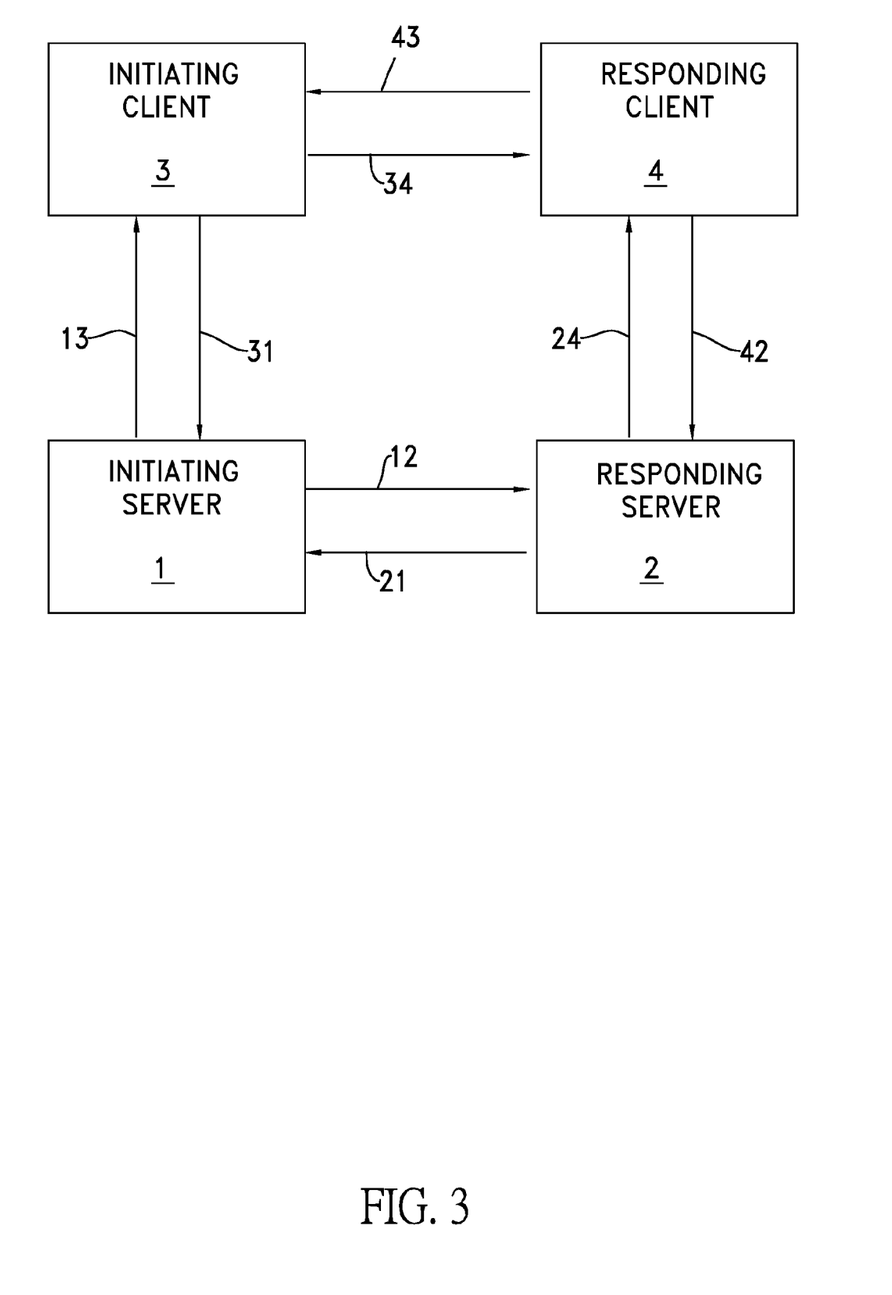
FIG. 3 is a functional block diagram of the electronic communication system in FIG. 2 illustrating communication of a third embodiment of a method for communication of the electronic system in an open environment in accordance with the present invention.

With reference to FIG. 3, the electronic communication system in FIG. 2 is shown. In the electronic communication system, instead of making connection to the responding server 2 for inviting the responding client 4 to have communication, the initiating client 3 passes the invitation via the initiating server 1.

A third embodiment of a method for communication of the electronic communication system in an open environment is performed by the electronic communication system and differs from the second embodiment of the method in having the following alternative steps for initiator and responder to communicate with each other.

Step 601: The initiating client 3 generates data (data #1) containing the unique name of the responding server 2, the responder's account ID and the initiator's account ID.

Step 602: The initiating client 3 sends data #1 to the initiating server 1 using the private-public key pair of the initiating client 3 and the private-public key pair of the initiating server 1 for sustaining data privacy and authenticating the identity of the initiating client 3. Such flow of the data #1 is represented by an information flow 31 in FIG. 3.

Step 603: The initiating server 1 detects an IP Address of the initiating client 3.

Step 604: The initiating server 1 generates data (data #2) containing the responder's account ID, the initiator's account ID, the IP Address of the initiating client 3 and the public key of the initiating client 3.

Step 605: The initiating server 1 makes connection to the responding server 2 based on the unique name of the responding server 2.

Step 606: The initiating server 1 sends data #2 to the responding server 2 using the private-public key pair of the initiating server 1 and the private-public key pair of the responding server 2 for sustaining data privacy and authenticating the identity of the initiating server 1. Such flow of the data #2 is represented by an information flow 12 in FIG. 3.

Step 607: The responding server 2 generates data (data #3) containing the public key of the responding client 4 based on the responder's account ID.

Step 608: The responding server 2 sends data #3 to the initiating server 1 using the private-public key pair of the responding server 2 and the private-public key pair of the initiating server 1 for sustaining data privacy and authenticating the identity of the responding server 2. Such flow of the data #3 is represented by an information flow 21 in FIG. 3.

Step 609: The initiating server 1 generates data (data #4) containing the public key of the responding client 4.

Step 610: The initiating server 1 sends data #4 to the initiating client 3 using private-public key pair of the initiating client 3 and private-public key pair of the initiating server 1 for sustaining data privacy and authenticating the identity of the initiating server 1. Such flow of the data #4 is represented by an information flow 13 in FIG. 3.

Step 611: The responding server 2 generates data (data #5) containing the initiator's account ID, the IP Address of the initiating client 3 and the public key of the initiating client 3.

Step 612: The responding server 2 sends data #5 to the responding client 4 using the private-public key pair of the responding server 2 and the private-public key pair of the responding client 4 for sustaining data privacy and authenticating the identity of the responding server 2. Such flow of the data #5 is represented by an information flow 24 in FIG. 3.

Step 613: Based on the initiator's account ID, the responder determines whether or not to accept the initiator's invitation. If a decision is made not to accept, the process terminates; otherwise, the process proceeds to the next step.

Step 614: The responding client 4 makes connection to the initiating client 3 based on the IP Address of the initiating client 3.

Step 615: The responding client 4 generates a verification token containing a text, a graphic, a sound, a voice, a video, or a combination thereof.

Step 616: The responding client 4 sends the verification token to the initiating client 3 using the private-public key pairs of the responding client 4 and the initiating client 3 for verifying the identity of the initiating client 3. Those flows for verifying the identity of the initiating client 3 are represented by information flows 43, 34 in FIG. 3. If the verification fails, the process terminates; otherwise, the process proceeds to the next step.

Step 617: The responding client 4 generates data (data #6) containing the responder's account ID.

Step 618: The responding client 4 sends data #6 to the initiating client 3 using the private-public key pair of the responding client 4 and the private-public key pair of the initiating client 3 for sustaining data privacy and authenticating the identity of the responding client 4. Such flow of the data #6 is represented by an information flow 43 in FIG. 3.

Step 619: The initiating client 3 checks if the responder's account ID is what the initiating client 3 intends to communicate with. If yes, the initiating client 3 and the responding client 4 may begin communication based on common communication protocols.

Based on the above description, there are many advantages in the present method for two users to communicate with each other via both the servers of the users. Some of the major advantages of the present method are:

1. Even if the users have accounts in different electronic communication systems, they may communicate with each other via the inviter's server and the invitee's server.

2. At the very beginning, when the initiating client 3 sends data #1 with the initiator's intent of communicating with the responder, the initiating server 1 authenticates the identity of the initiating client 3 before proceeding to the next step.

3. Prior to the intended communication, both users mutually authenticate the identity of the other party using the public key of the other party that is provided by the other party's server, the most authoritative entity to provide the public keys for account holders thereof.

4. The sent data is encrypted with the private-public key pairs for data privacy and authentication of the sender.

5. Both users get all the needed information of the other party via their own servers that the users might be more familiar with.

6. After the responding client 4 makes connection to the initiating client 3 based on the IP Address of the initiating client 3, steps of mutual authentication of the initiating client 3 and the responding client 4 may be different from those stated in the second embodiment depending on if the responding client 4 or the initiating client 3 will start communication right after mutual authentication.

Figure 4:
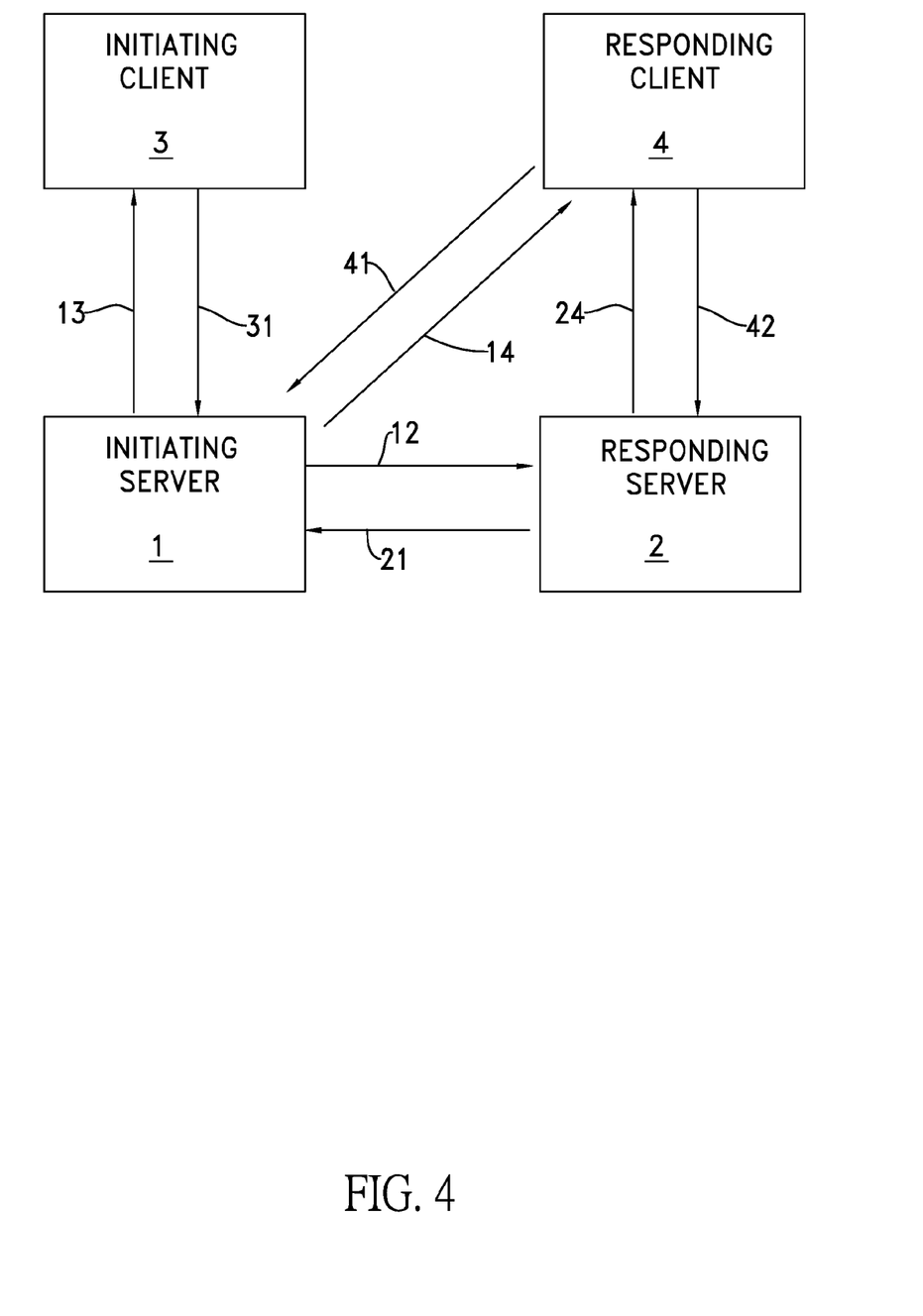
FIG. 4 is a functional block diagram of the electronic communication system in FIG. 2 illustrating communication of a fourth embodiment of a method for communication of the electronic system in an open environment in accordance with the present invention.

With reference to FIG. 4, the electronic communication system in FIG. 2 is shown to illustrate communication for an inviter (initiator) to invite an invitee (responder) to access the initiator's resources saved on the initiator's server that the responder has no account with while the initiator's server cannot access the initiator's resources.

A fourth embodiment of a method for communication of the electronic communication system in an open environment is performed by the electronic communication system, and has the following steps for the initiator to save the initiator's resources on the initiator's server prohibiting the initiator's server from accessing the initiator's resources.

Step 701: The initiating client 3 creates resources containing text, graphic, sound, voice, audio, video, or a combination thereof.

Step 702: The initiating client 3 encrypts the resources with a symmetric key.

Step 703: The initiating client 3 sends the encrypted resources to the initiating server 1.

Step 704: The initiating server 1 keeps the encrypted resources.

Based on the above description, there are many advantages of the present method for saving client's resources on the server. One of the major advantages is:

The initiating server 1 cannot access the initiator's resources since the initiating server 1 doesn't have the symmetric key to decrypt the encrypted resources.

If the initiating client 3 doesn't have the public key of the responding client 4, the present method includes the following steps for the initiating client 3 to have the public key of the responding client 4.

Step 801: The initiating client 3 generates data (data #1) containing a unique name of the responding server 2 and the responder's account ID.

Step 802: The initiating client 3 sends data #1 to the initiating server 1. Such flow of the data #1 is represented by an information flow 31 in FIG. 4.

Step 803: The initiating server 1 generates data (data #2) containing the responder's account ID.

Step 804: The initiating server 1 makes connection to the responding server 2 based on the unique name of the responding server 2.

Step 805: The initiating server 1 sends data #2 to the responding server 2. Such flow of the data #2 is represented by an information flow 12 in FIG. 4.

Step 806: The responding server 2 generates data (data #3) containing the responder's account ID and the public key of the responding client 4 based on the responder's account ID.

Step 807: The responding server 2 encrypts data #3 with the private key of the responding server 2.

Step 808: The responding server 2 sends the encrypted data #3 to the initiating server 1. Such flow of the data #3 is represented by an information flow 21 in FIG. 4

Step 809: The initiating server 1 decrypts the encrypted data #3 with the public key of the responding server 2 to obtain and keep the responder's account ID and the public key of the responding client 4.

Step 810: The initiating server 1 generates data (data #4) containing the public key of the responding client 4.

Step 811: The initiating server 1 encrypts data #4 with the private key of the initiating server 1.

Step 812: The initiating server 1 sends data #4 to the initiating client 3. Such flow of the data #4 is represented by an information flow 13 in FIG. 4.

Step 813: The initiating client 3 decrypts the encrypted data #4 with the public key of the initiating server 1 to obtain the public key of the responding client 4.

Based on the above description, there are many advantages of the present method, and some of the major advantages are:

1. The initiating client 3 obtains the public key of the responding client 4 via the initiating server 1 from the responding server 2 that administrates the account of the responder using the responding client 4 and is the most authoritative entity to provide public keys for account holders thereof.

2. Sending the public key of the responding client 4 to the initiating client 3 is ensured by authenticating the identities of the responding server 2 and the initiating server 1 using the private-public key pairs of the responding server 2 and the initiating server 1.

Once the initiating client 3 has the public key of the responding client 4, the present method has the following steps for the responding client 4 to access the resources of the initiating client 3 saved on the initiating server 1.

Step 901: The initiating client 3 encrypts the symmetric key, which was used to encrypt the initiator's resources for saving on the initiating server 1 as described in the previous paragraphs, with the public key of the responding client 4.

Step 902: The initiating client 3 generates data (data #1) containing the initiator's account ID, the unique name of the responding server 2, the responder's account ID, and the encrypted symmetric key.

Step 903: The initiating client 3 sends data #1 to the initiating server 1 using the private-public key pair of the initiating client 3 and the private-public key pair of the initiating server 1 for sustaining data privacy and authenticating the identity of the initiating client 3. Such flow of the data #1 is represented by an information flow 31 in FIG. 4.

Step 904: The initiating server 1 generates data (data #2) containing the responder's account ID, the unique name of the initiating server 1, the initiator's account ID and the encrypted symmetric key.

Step 905: The initiating server 1 makes connection to the responding server 2 based on the unique name of the responding server 2.

Step 906: The initiating server 1 sends data #2 to the responding server 2 using the private-public key pair of the initiating server 1 and the private-public key pair of the responding server 2 for sustaining data privacy and authenticating the identity of the initiating server 1. Such flow of the data #2 is represented by an information flow 12 in FIG. 4.

Step 907: The responding server 2 generates data (data #3) containing the unique name of the initiating server 1, the initiator's account ID and the encrypted symmetric key.

Step 908: Based on the responder's account ID, the responding server 2 sends data #3 to the responding client 4 using the private-public key pair of the responding server 2 and the private-public key pair of the responding client 4 for sustaining data privacy and authenticating the identity of the responding server 2. Such flow of the data #3 is represented by an information flow 24 in FIG. 4.

Step 909: The responding client 4 makes connection to the initiating server 1 based on the unique name of the initiating server 1.

Step 910: The responding client 4 generates data (data #4) containing the initiator's account ID and the responder's account ID.

Step 911: Since the initiating server 1 keeps the responder's account ID and the public key of the responding client 4 as in the previous description of obtaining public key of the responding client 4 by the initiating client 3, the responding client 4 may send data #4 to the initiating server 1 using the private-public key pair of the responding client 4 for authenticating the identity of the responding client 4. Such flow of the data #4 is represented by an information flow 41 in FIG. 4. If the authentication fails, then the process terminates; otherwise, the process proceeds to the next step.

Step 912: Based on the initiator's account ID and the responder's account ID, the initiating server 1 sends the encrypted initiator's resources, which is sent by the initiating client 3 and saved on the initiating server 1 as described in the previous paragraphs for saving the initiator's resources on the initiator's server, to the responding client 4. Such flow of sending the encrypted initiator's resources is represented by an information flow 14 in FIG. 4.

Step 913: The responding client 4 decrypts the encrypted symmetric key with the private key of the responding client 4 to obtain the symmetric key.

Step 914: The responding client 4 decrypts the encrypted initiator's resources with the symmetric key to obtain the initiator's resources.

Based on the above description, there are many advantages of the present method for responder, who has no account with the initiator's server but can be authenticated by the server, to access initiator's resources that are saved on initiator's server. Some of the major advantages are:

1. The initiator's resources are encrypted with a symmetric key for data privacy so that no one can obtain the initiator's resources without the symmetric key.

2. Only the responder invited by the initiator can get the symmetric key with the responder's private key.

3. Only the responder invited by the initiator can access the initiator's resources by decrypting the encrypted initiator's resources with the symmetric key.

4. Even if the initiator's server cannot access the initiator's resources, the initiator's server can authenticate the identity of the responder for allowing the responder to have the encrypted initiator's resources even if the responder has no account with the initiator's server.

Figure 5:
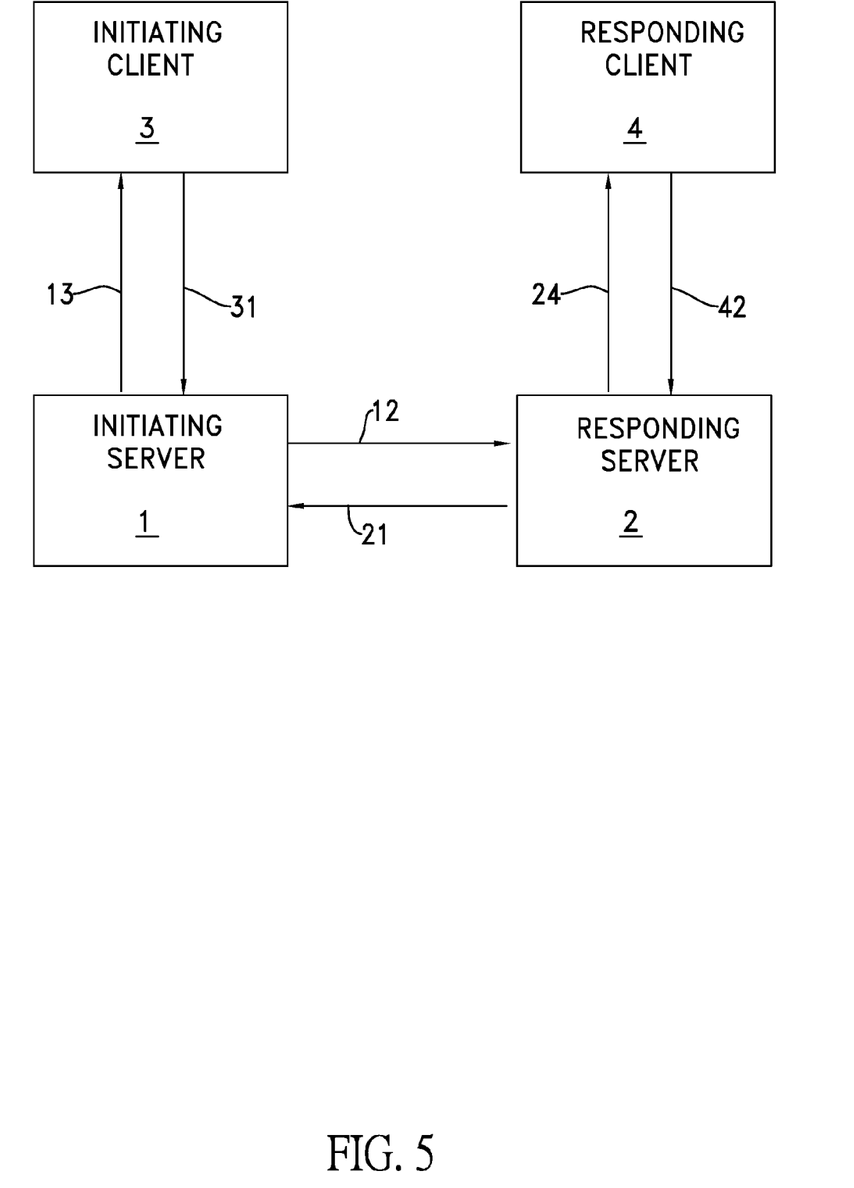
FIG. 5 is a functional block diagram of the electronic communication system in FIG. 2 illustrating communication of a fifth embodiment of a method for communication of the electronic system in an open environment in accordance with the present invention.

With reference to FIG. 5, the electronic communication system in FIG. 4 is shown to illustrate communication for the initiator's resources to be sent to the responder via the initiator's server and the responder's server instead of letting the responder make connection to the initiator's server and access the initiator's resources from the initiator's server.

A fifth embodiment of a method for communication of the electronic communication system in an open environment is performed by the electronic communication system, and has steps for the initiator to save the initiator's resources on the initiator's server prohibiting the initiator's server from accessing the initiator's resources and steps for the initiating client 3 to get public key of the responding client 4 being the same as those in the fourth embodiment of the method.

The present method further has the following steps for sending the initiator's resources, which are saved on the initiating server 1, to the responding client 4.

Step 1001: the initiating client 3 encrypts the symmetric key, which was used to encrypt the initiator's resources before saving on the initiating server 1 as described in the previous paragraphs, with the public key of the responding client 4.

Step 1002: the initiating client 3 generates data (data #1) containing the initiator's account ID, the unique name of responding server 2, the responder's account ID, and the encrypted symmetric key.

Step 1003: The initiating client 3 sends data #1 to the initiating server 1 using the private-public key pair of the initiating client 3 and the private-public key pair of the initiating server 1 for sustaining data privacy and authenticating the identity of the initiating client 3. Such flow of the data #1 is represented by an information flow 31 in FIG. 5.

Step 1004: The initiating server 1 generates data (data #2) containing the responder's account ID, the initiator's account ID, the encrypted symmetric key and the encrypted initiator's resources based on the initiator's account ID.

Step 1005: The initiating server 1 makes connection to the responding server 2 based on the unique name of the responding server 2.

Step 1006: the initiating server 1 sends data #2 to the responding server 2 using the private-public key pair of the initiating server 1 and the private-public key pair of the responding server 2 for sustaining data privacy and authenticating the identity of the initiating server 1. Such flow of the data #2 is represented by an information flow 12 in FIG. 5.

Step 1007: The responding server 2 generates data (data #3) containing the initiator's account ID, the encrypted symmetric key and the encrypted initiator's resources.

Step 1008: Based on the responder's account ID, the responding server 2 sends data #3 to the responding client 4 using the private-public key pair of the responding server 2 and the private-public key pair of the responding client 4 for sustaining data privacy and authenticating the identity of the responding server 2. Such flow of the data #3 is represented by an information flow 24 in FIG. 5.

Step 1009: The responder checks the initiator's account ID. If the responder is not interested in getting the initiator's resources, then the process terminates; otherwise, the process proceeds to the next step.

Step 1010: The responding client 4 decrypts the encrypted symmetric key with the private key of the responding client 4 to obtain the symmetric key.

Step 1011: The responding client 4 decrypts the encrypted initiator's resources with the symmetric key to obtain the initiator's resources.

Based on the above description, there are many additional advantages of the present method for the responder to obtain the initiator's resources that are saved on the initiator's server. Some of the major advantages are:

1. The initiator's resources are encrypted with a symmetric key for data privacy so that no one can obtain the initiator's resources without the symmetric key.

2. Only the responder invited by the initiator can get the symmetric key with the responder's private key.

3. Only the responder invited by the initiator can access the initiator's resources by decrypting the encrypted initiator's resources with the symmetric key.

4. Even if the initiator's server cannot access the initiator's resources, the initiator's resources are sent to the responder instead of waiting for the responder to access the initiator's server so that the initiator's server doesn't need to keep the initiator's resources for too long.

The present invention provides electronic communication systems and methods applicable in an open environment allowing a user to perform operations with a server that the user has no account with but the identity of the user can be authenticated by the server, also allowing two users having accounts with different servers in different electronic communication systems to authenticate and communicate with each other, and allowing an invitee to access an inviter's resources saved on the inviter's server that the invitee has no account with.

While the above description contains many specifications, these should not be construed as limitations on the scope of the invention, but rather as an exemplification of preferred embodiments thereof. Many other variations are possible based on the principles of the invention. For example, the inviter's resources may be sent from the initiating client 3 via the initiating server 1 rather than from the initiating server 1 with resources that was already saved on the initiating server 1. Another example is: sending the inviter's resources to the invitee may be deviated as remitting fund.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method allowing communication to be performed in an open environment, the method performed by an electronic communication system including an initiating client, an initiating server, a responding client and a responding server, wherein the initiating client is a local communication device and is used by an initiating user that has an initiating account administrated by the initiating server as a server computer, the responding client is another local communication device and is used by a responding user that has a responding account administrated by the responding server as a server computer, the initiating server, the responding server, the initiating client and the responding client are connected to communication networks, each of the initiating server, the responding server, the initiating client and the responding client has a private-public key pair, the initiating server has a unique name assigned and registered with authorities for making connection to the initiating server, and the responding server has a unique name assigned and registered with the authorities for making connection to the responding server;

the method comprising steps of:
providing an initiating server's public key of the initiating server's private-public key pair by the initiating server to a requester of the initiating server's public key that makes connection to the initiating server using the initiating server's unique name;
providing a responding server's public key of the responding server's private-public key pair by the responding server to a requester of the responding server's public key that makes connection to the responding server using the responding server's unique name;
providing an initiating client's public key of the initiating client's private-public key pair by the initiating client to the initiating server using the initiating server's unique name;
providing a responding client's public key of the responding client's private-public key pair by the responding client to the responding server using the responding server's unique name;
upon communication request by a responding member selected from the responding server and the responding client, providing the initiating client's public key by the initiating server to the responding member;
authenticating the initiating client by the responding member with the initiating client's public key, and if authentication succeeds, continuing communication between the responding member and the initiating client by the selected one of the responding server and the responding client;
upon communication request by an initiating member selected from the initiating server and the initiating client, providing the responding client's public key by the responding server to the initiating member; and
authenticating the responding client by the initiating member with the responding client's public key, and if authentication succeeds, continuing communication between the initiating member and the responding client by the selected one of the initiating client and initiating server.

2. The method as claimed in claim 1, wherein
the step of providing the initiating client's public key to the responding member further comprises steps of:
connecting the responding server by the initiating client with the responding server's unique name;
providing the initiating server's unique name and an initiating account ID of the initiating account by the initiating client to the responding server;
connecting the initiating server by the responding server with the initiating server's unique name;
providing the initiating account ID by the responding server to the initiating server to request the initiating client's public key; and
providing the initiating client's public key by the initiating server to the responding server.

3. The method as claimed in claim 2, further comprising steps of:
providing a responding account ID of the responding account and an initiating name to be recognized by the responding user, by the initiating client to the responding server;
based on the responding account ID, providing the responding client's public key by the responding server to the initiating client;
based on the responding account ID, providing the initiating name, an initiating IP address of the initiating client and the initiating client's public key by the responding server to the responding client;
if the responding user agrees to communicate with the initiating user based on the initiating name, connecting the initiating client by the responding client with the initiating IP address, and otherwise, terminating all processes of the electronic communication system;
authenticating the responding client by the initiating client with the responding client's public key, and if authentication fails, terminating all the processes of the electronic communication system; and
authenticating the initiating client by the responding client with the initiating client's public key, and if authentication fails, terminating all the processes of the electronic communication system, and otherwise, continuing communication between the initiating client and the responding client by the responding client.

4. The method as claimed in claim 1, wherein the step of providing the responding client's public key to the initiating member further comprises steps of:

providing the responding server's unique name, a responding account ID of the responding account and an initiating name to be recognized by the responding user, by the initiating client to the initiating server;

connecting the responding server by the initiating server with the responding server's unique name;

providing the responding account ID, the initiating name, an initiating IP address of the initiating client and the initiating client's public key by the initiating server to the responding server;

based on the responding account ID, providing the responding client's public key by the responding server to the initiating server;

providing the responding client's public key by the initiating server to the initiating client;

based on the responding account ID, providing the initiating name, the initiating IP address and the initiating client's public key by the responding server to the responding client;

if the responding user agrees to communicate with the initiating user based on the initiating name, connecting the initiating client by the responding client with the initiating IP address; otherwise, terminating all the processes of the electronic communication systems;

authenticating the responding client by the initiating client with the responding client's public key, and if authentication fails, terminating all the processes of the electronic communication system;

authenticating the initiating client by the responding client with the initiating client's public key, if authentication fails, terminating all the processes of the electronic communication system, and otherwise, continuing communication between the initiating client and the responding client by the responding client.

5. The method as claimed in claim 1, wherein the step of providing the responding client's public key to the initiating member further comprises steps of:

providing the responding server's unique name, a responding account ID and an initiating name to be recognized by the responding user, by the initiating client to the initiating server;

connecting the responding server by the initiating server with the responding server's unique name;

providing the responding account ID, the initiating name and the initiating server's unique name by the initiating server to the responding server;

based on the responding account ID, providing the responding client's public key by the responding server to the initiating server;

based on the responding account ID, providing the initiating name and the initiating server's unique name by the responding server to the responding client;

if the responding user agrees to communicate with the initiating server based on the initiating name, connecting the initiating server by the responding client with the initiating server's unique name, and otherwise, terminating all the processes of the electronic communication system;

authenticating the responding client by the initiating server with the responding client's public key, if authentication fails, terminating all the processes of the electronic communication system, and otherwise, continuing communication between the initiating server and the responding client by the initiating server.

6. The method as claimed in claim 1, further comprising steps of:

providing data, the responding server's unique name, a responding account ID and an initiating name to be recognized by the responding user, by the initiating client to the initiating server;

connecting the responding server by the initiating server with the responding server's unique name;

providing the data, the responding account ID, and the initiating name by the initiating server to the responding server;

based on the responding account ID, providing the data and the initiating name by the responding server to the responding client.

* * * * *